(12) United States Patent
Matsumoto et al.

(10) Patent No.: US 7,120,466 B2
(45) Date of Patent: Oct. 10, 2006

(54) METHOD FOR ACCEPTING SIGN-UP APPLICATIONS FROM APPLICANTS WHO DESIRE TO UTILIZE WIRELESS COMMUNICATION SERVICES

(75) Inventors: Noboru Matsumoto, Tokyo (JP); Tadashi Aizawa, Tokyo (JP); Hiroshi Wada, Tokyo (JP)

(73) Assignee: The Tokyo Electric Power Compsny, Inc., Tokyo (JP)

( * ) Notice: Subject to any disclaimer, the term of this patent is extended or adjusted under 35 U.S.C. 154(b) by 9 days.

(21) Appl. No.: 10/472,354

(22) PCT Filed: Mar. 20, 2002

(86) PCT No.: PCT/JP02/02728

§ 371 (c)(1),
(2), (4) Date: Feb. 25, 2004

(87) PCT Pub. No.: WO02/076128
PCT Pub. Date: Sep. 26, 2002

(65) Prior Publication Data
US 2004/0147256 A1 Jul. 29, 2004

(30) Foreign Application Priority Data
Mar. 21, 2001 (JP) .............................. 2001-080945

(51) Int. Cl.
*H04M 1/00* (2006.01)
(52) U.S. Cl. .................... 455/562.1; 455/414.1
(58) Field of Classification Search ............... 455/446, 455/436, 456.5, 442, 427, 435.1, 445, 447, 455/562.1; 701/207, 208, 214
See application file for complete search history.

(56) References Cited

U.S. PATENT DOCUMENTS

| 6,173,186 B1 * | 1/2001 | Dalley .................... 455/446 |
| 6,735,438 B1 * | 5/2004 | Sabatino .................. 455/427 |
| 2002/0090944 A1 * | 7/2002 | Shepherd .................. 455/435 |
| 2004/0180698 A1 * | 9/2004 | Kamemura et al. ...... 455/562.1 |

FOREIGN PATENT DOCUMENTS

| JP | 9-153867 | 6/1997 |
| JP | WO98/23043 | 5/1998 |
| JP | 2000-349903 | 12/2000 |

* cited by examiner

*Primary Examiner*—Temica Beamer
*Assistant Examiner*—Joy K. Contee
(74) *Attorney, Agent, or Firm*—Wells St. John, P.S.

(57) ABSTRACT

When a user inputs necessary details on a user's decision screen and transmits the inputted details (Step S3), an acceptance server 12 reads an address list from an address DB 21 and then transmits the address list to the user (Step S4). When the user selects an address from the address list and transmits the selected address, an area decision server 13 retrieves and reads a map of the surrounding of the selected address from a map DB 23 and transmits the map to the user (Step S6). The user then inputs the numbers of stories of a building where the user desires to utilize the wireless communication service and the direction of an antenna based on the map of the surrounding, and transmits those inputted particulars (Step S7). The area decision server 13 reads base station information from a base station DB 24 and calculates the transmission characteristic between two points, namely the antenna and the base station, to decide whether communication between the two points is executable or not. If it is decided that the communication is executable, the sign-up application is accepted.

16 Claims, 6 Drawing Sheets

Please input direction of antenna: [South] direction
Please input story: [8th] story
Please input numbers of rooms on the story you live: [4] rooms
Please input location of room you live: [3rd] room from [East] direction

METHOD FOR ACCEPTING SIGN-UP APPLICATIONS FROM APPLICANTS WHO DESIRE TO UTILIZE WIRELESS COMMUNICATION SERVICES

CROSS REFERENCE TO RELATED APPLICATION

This application is a 35 U.S.C. §371 of and claims priority to PCT International Application Number PCT/JP02/02728, which was filed 20 Mar. 2002 (20.03.02), and was published in Japanese which was based on Japanese Patent Application No. 2001-080945 which was filed 21 Mar. 2001 (21.03.01) and the teachings of which are incorporated herein by reference.

FIELD OF THE INVENTION

The present invention relates to a method for accepting a sign-up application from an applicant who desires to utilize wireless communication services on the Internet, and more particularly to a method capable of accepting a sign-up application from an applicant who desires to utilize wireless communication services, with the method a communication service provider can automatically decide whether communication is executable or not without visiting to an emplacement where a communication apparatus such as a personal computer of an applicant who desires to utilize wireless communication services is installed.

BACKGROUND ART

In the past, when an applicant who desires to utilize wireless communication services (hereinafter referred to as "an applicant for utilizing service") makes his/her sign-up application, the applicant for utilizing service generally makes the sign-up application after making his/her decision as to whether communication is executable or not based on checking of a planar map provided by a communication service provider (hereinafter referred to as "a service provider") in which communication-executable areas are differentiated with colors, or inquiring of the service provider about whether the communication is executable or not.

When the applicant for utilizing service makes his/her sign-up application following to designation of his/her emplacement for utilizing the communication, the service provider temporarily accepts the sign-up application, then carrying out a field confirmation test such as an optical outlook confirmation test at a location between two points, namely an emplacement where the applicant for utilizing service wishes to install his/her wireless communication apparatus (a personal computer and the like) and a wireless base station which is the communication counterpart of the applicant. Then, the sign-up application will be accepted in due form only when the outlook test was confirmed with a good result.

However, with the foresaid method for deciding whether communication is executable or not based on the planar map that differentiates the communication-executable areas with colors, the same decision result will be obtained by plural applicants for utilizing service, even in the case they are living on different stories, such as the first story and the fifth story, in the same apartment house, and the heights of the installed positions of antennas of wireless communication apparatuses are thereby different. Accordingly, if buildings are located between the antenna of the apartment house and the antenna of the wireless base station (for example, set on a utility pole) provided by the service provider, and therefore, communication is not executable with the wireless communication apparatus located on the first story due to blockade by the buildings while communication is executable with the wireless communication apparatus located on the fifth story, there has been a problem that such a difference in the state of the communication cannot be proven.

In addition, with the foresaid method wherein the applicant for utilizing service makes inquiries of the service provider, there has been such a problem that the service provider has to retain reception staffs, causing the provider to pay labor fees and generating erroneous inputs with respect to the inquiries.

Also, in case that the applicant for utilizing service makes his/her sign-up application with appointing the emplacement for utilizing communication, the service provider is required to carry out a field confirmation test such as an optical outlook confirmation test for every sign-up application. Therefore, there has been a problem that labors, time and cost are required for the service provider to carry out such a confirmation test.

The present invention is achieved in view of the foresaid problems of the prior arts, and it is an object of the present invention to provide a method for accepting a sign-up application from an applicant who desires to utilize wireless communication services, the method being capable of accurately deciding whether communication is executable or not by taking the height of an antenna installed at the applicant for utilizing service into consideration and automatically transacting the sign-up application without requiring data inputs.

DISCLOSURE OF THE INVENTION

For achieving the foregoing object, the present invention provides a method for accepting on a network a sign-up application from the applicant who desires to utilize wireless communication services based on the request from the applicant for utilizing service by means of a server of a wireless communication service provider that executes wireless communication services between one of antennas installed at a plurality of wireless base stations and an antenna installed at the user side, and a database containing at least map information and base station information relating to the emplacements and heights over the ground of the antennas installed at the wireless base stations. This method has a major characteristic in that the method comprises a step for receiving data relating to emplacement decision information sent from the applicants who desire to utilize wireless communication services via the network by means of the server, a step for reading map information from the database based on the data relating to the emplacement decision information and deciding one wireless base station from a plurality of wireless base stations, a step for reading map information from the database based on the data relating to the emplacement decision information and acquiring emplacement information relating to at least a height over the ground and a direction of the antenna to be installed by the side of the applicant who desires to utilize wireless communication services, a step for making a decision as to whether communication between two antennas, namely an antenna by the side of the applicant who desires to utilize wireless communication services and an antenna at the wireless base station, is executable or not based on the acquired emplacement information on the antenna installed at the side of the applicant and the base station information on the antenna installed at the decided base station, and a step for transmitting information of accepting the sign-up application to the applicant who desires to utilize wireless communication services, when it was decided as communication-executable in the foresaid step for making a decision as to whether communication is executable or not.

BEST MODE FOR CARRYING OUT THE INVENTION

Figure 1:
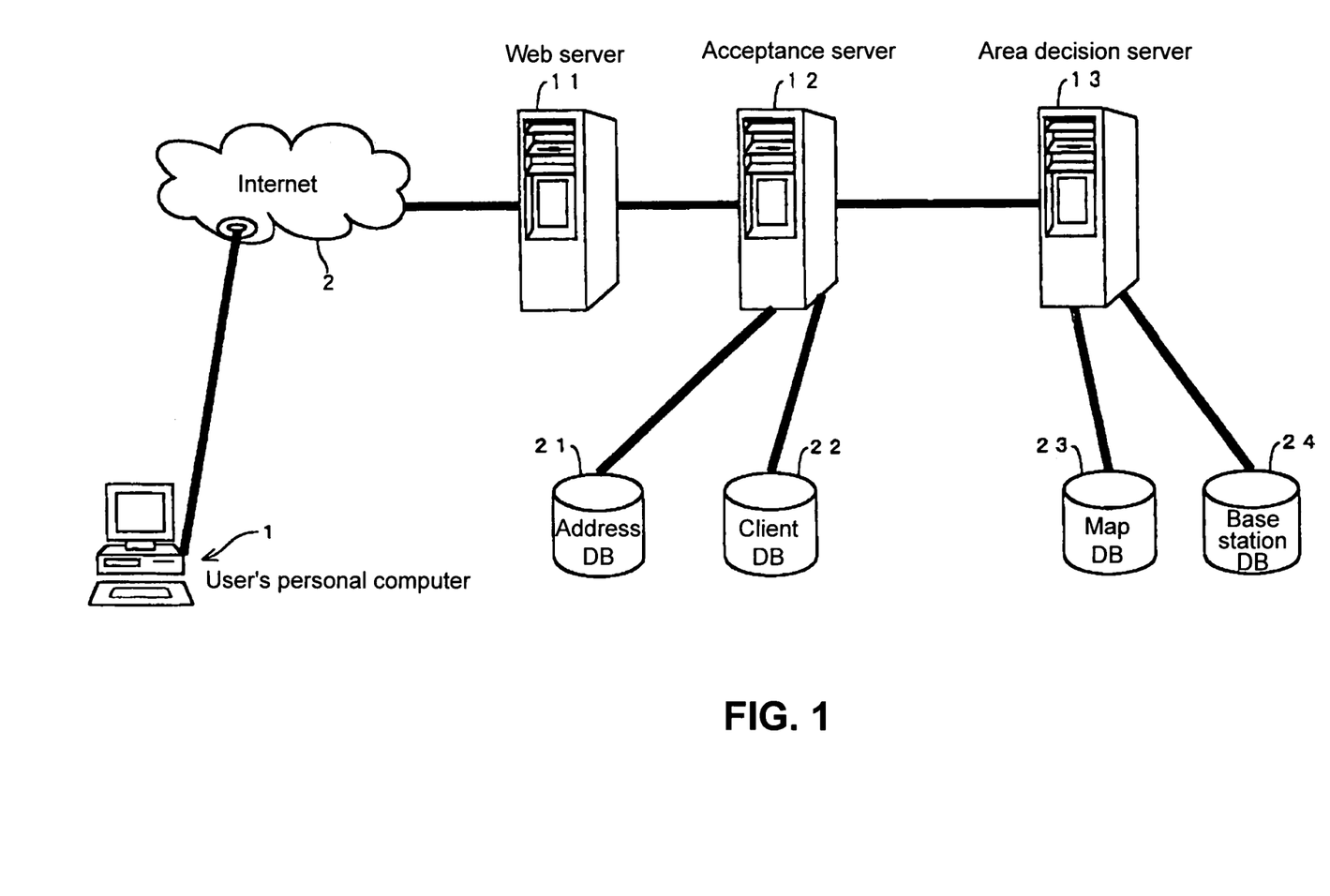
FIG. 1 is a block diagram showing a schematic configuration of a communication system to which the present invention is applied.

Now, the present invention is explained in detail with reference to the appended drawings. FIG. 1 is a schematic view showing a configuration of a communication system to be used for carrying out the present invention.

In FIG. 1, a reference numeral 1 depicts a personal computer used by the applicant for utilizing service (hereinafter referred to as "user's personal computer") when the applicant makes a sign-up application, the user's personal computer 1 is connected to a network, e.g., the Internet 2. On the other hand, the service provider comprises a web server 11, an acceptance server 12 and an area decision server 13, and these servers are connected to the Internet 2. The acceptance server 12 is provided with an address database 21 and a client database 22, while the area decision server 13 is provided with a map database 23 and a base station database 24.

A terminal installed in a personal computer shop can be an example of the user's personal computer. Specifically, a sign-up CD (a free-of-charge CD in which a software for allowing to automatically connect to the sign-up application server is written) is placed in the shop and the sign-up CD is installed into the terminal so that the user can connect to the area decision site, the site for deciding whether communication is executable or not and/or the sign-up application site.

As the alternative example, a terminal that can connect only to the system to decide whether communication is executable or not is installed in a personal computer shop. With such a terminal, the user who has newly bought a personal computer can check an availability to utilize wireless communication services at the time of having purchased the personal computer, and the user can immediately make its sign-up application if it is decided that the use of the wireless communication service is available.

As will be described later, a planar map data is included in the map database 23, and data as to the coordinates indicating the emplacement of an antenna and the height over the ground of the antenna at the base station are included in the base station database 24.

Now, the operations in this embodiment will be explained with reference to the timing chart shown in FIG. 2. In the first place, in the step S1, a user's personal computer 1 accesses the web server 11 and requests a user decision screen. In the step S2, upon the request, the acceptance server 12 sends the user decision screen to the user's personal computer. In the step S3, the user inputs its name, e-mail address, age, job, etc. on the user decision screen and transmits the inputted information. In the step S4, the acceptance server 12 reads an address list from the address database 21 and transmits the address list to the user's personal computer 1. In the step S5, the user selects its own address from the address list and transmits the own address. Specifically, prefectures, cities, towns and villages, chomes, house numbers and the like are displayed in such a manner that they can be selected from a pull-down menu, and the address is transmitted in response to the user's selection of the own address from the menu. For example, when the user selects "Tokyo" as a prefecture, then wards or the like to be selected appear in the menu. When "Shibuya" as a ward is selected, the chomes or the like in Shibuya ward are displayed and the menu becomes ready to be selected. Then, from the displayed address list, "Hatsudai 1-chome" is selected, for example. As explained above, the address can be transmitted directly in response to the user's selection of the address. In the step S6, the area decision server 13 refers to the map database 23, retrieves and reads a map of the surrounding of the selected address based on the selected address, and transmits the map to the user. It should be noted that there is a reason to provide an address list to the user and let the user select the own address as described above without requesting the user to input its own address by itself. If the user inputs its own address by itself, the manner of address notation becomes amorphous so that the subsequent processing of the inputted data becomes troublesome, or there is probability of receiving erroneous inputs.

Figure 3:
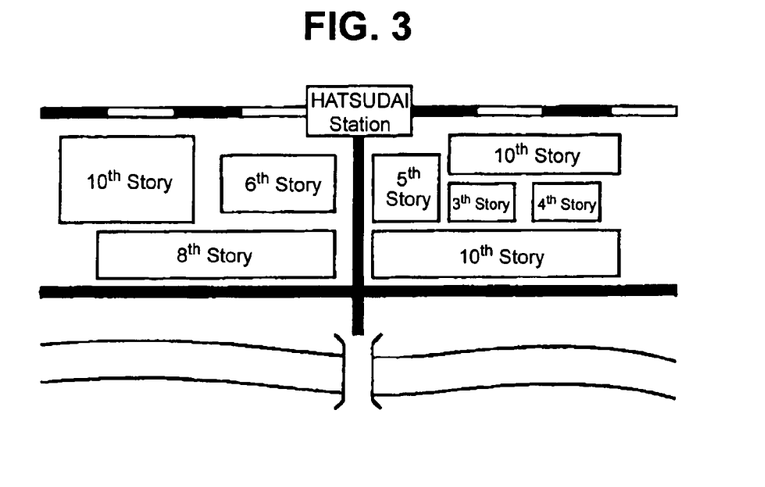
FIG. 3 is a schematic diagram of an example of planar map data.

FIG. 3 shows an example of the map database 23. In the map database 23, a planar map data as shown in FIG. 3 and data such as addresses, buildings, streets, sea levels and so on are stored. The data as to buildings include information on the shapes and stories of buildings.

Figure 4:
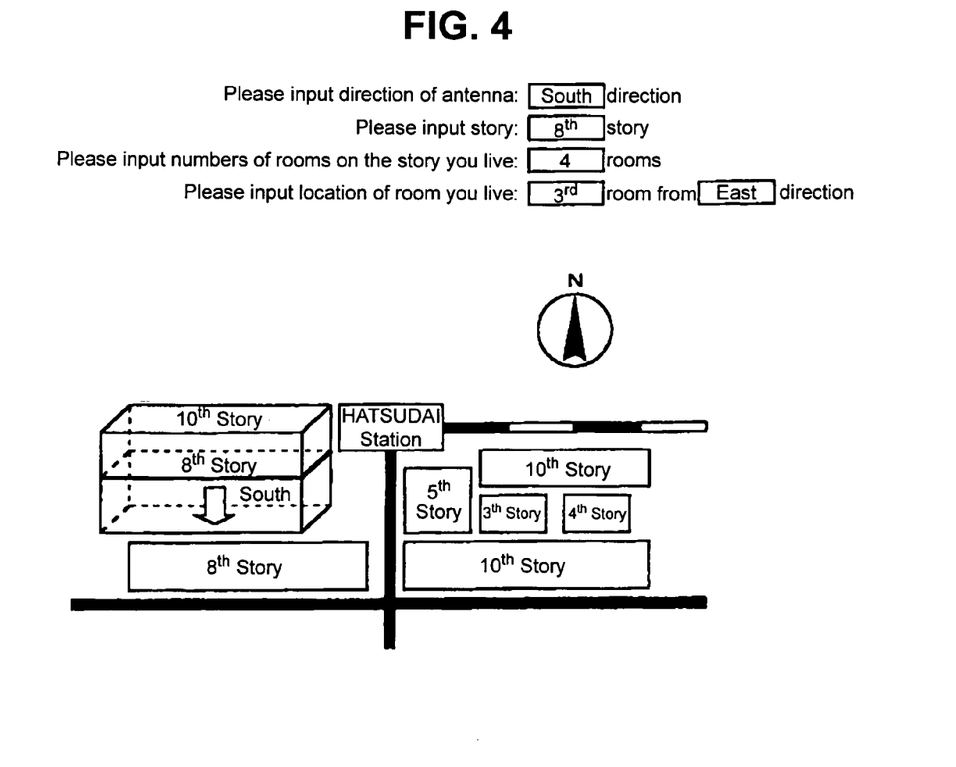
FIG. 4 is a view showing an example of a screen for inputting a story of a building and the direction of an antenna which is displayed on a screen of a user's personal computer.

Next, a planar map of the surrounding of the own address is displayed on the screen of the user's personal computer, and wordings, for example, "Please input the direction of an antenna", "Please input the story", "Please input the numbers of rooms on the story where you live", and "Please input the location of the room where you live" are displayed in the part of the screen. Then, in the step S7, the user registers information as to the room in which the service is utilized, such as the building to which his/her room belongs, the story of the room in which the antenna is installed, and the room number, and information as to the emplacement of the antenna such as the direction of the antenna, and then transmits the registered information. An example of the screen of the user's personal computer when the information was registered is illustrated in FIG. 4. In FIG. 4, an example in which information such as "direction; south", "$8^{th}$ story", "four rooms", and "the third room from the direction of east" are registered is shown, and an three-dimensional illustration of the building corresponding to the address, and indication of $8^{th}$ story and south are displayed on the screen of the user's personal computer. With this display, the emplacement of the antenna is revealed. Note that the three-dimensional illustration of the building may be displayed or not displayed on the screen.

Besides, the emplacement of the antenna may be defined beforehand based on the transmitted address in the step S5. For example, if the information, such as the story or the location of the room and so on corresponding to the room number of a condominium or an apartment, are registered in the map database beforehand, it is possible to acquire the information as to the emplacement of the antenna based on the address transmitted in the step S5. In this case, it is possible to omit the data inputting by the user in the step S7.

In the step S8, the area decision server 13 makes a decision as to whether communication between two points, that is, between the antenna at the user and the antenna at the base station, is executable or not based on the transmitted data from the step S7 and the base station information around the address read from the base station database 24 and transmits the result of the decision. The decision as to whether communication is executable or not is made subject to the result of the outlook decision between the two points. Note that the outlook decision between the two points with a pipe (Fresnel zone) having a certain length of radius and/or the receiving level decision with taking reflection and diffraction into consideration can be employed in combination in order to enhance reliability of the decision as to whether communication is executable or not.

Figure 5:
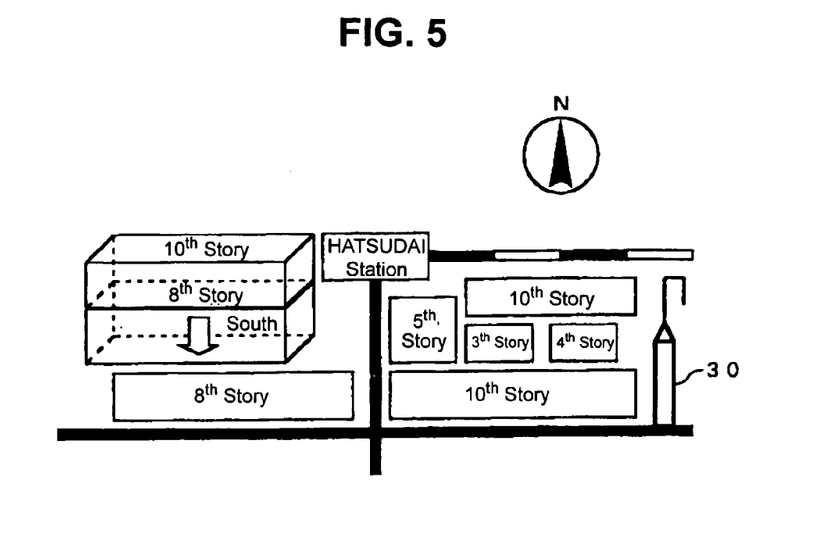
FIG. 5 is a view showing a screen where a wireless base station is read into the screen shown in FIG. 4.

It is shown in FIG. 5 that the base station database 24 retrieves the communication counterpart wireless base station 30 on the basis of the emplacement of the antenna inputted in the step S7 to obtain the position and the height over the ground of the antenna at the wireless base station 30. As an example, the height per each story of a building may be 4 meters, and the height of the antenna may be 15 meters since the antenna at the base station is installed on the top of a utility pole.

Figure 6:
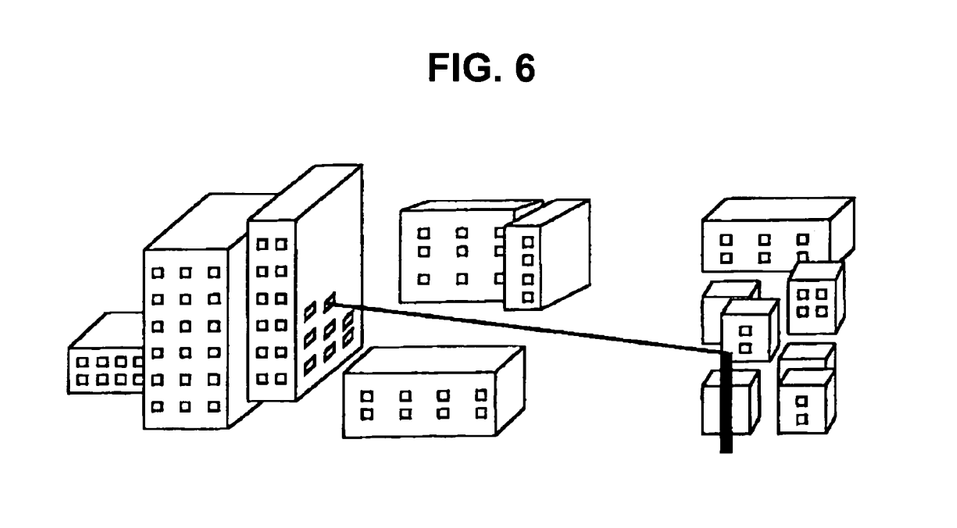
FIG. 6 is a schematic diagram of an outlook decision transaction between two points.

FIG. 6 is a view for illustrating the outlook decision between the two points. In this drawing, the plan view of FIG. 5 is converted into the three-dimensional view based upon data of the heights of buildings and the height of the antenna at the wireless base station, and two points, namely the antenna at the user and the antenna at the wireless base station, are converted into a three-dimensional coordinate. Further, the shapes of the buildings around the two points are converted into the three-dimensional shapes. Then, decision as to whether the antenna at the wireless base station exists or not in the range capable of executing communication from the antenna at the user is made with taking the transmission loss into consideration. If the antenna at the wireless base station exists, a line is drawn between the two points, namely the antennas at the user and in the wireless base station, to connect them. Then, another decision is made as to whether any buildings found to be a shield exist or not on a line connecting the two points where communication is executed. If there exists a building found to be a shield, communication between the two points is decided as not executable. On the other hand, if there exists no building found to be a shield, it is decided that communication is executable. In case there are a plurality of wireless base stations serving as the communication counterpart, the above-mentioned decision is made respectively for every wireless base station.

Figure 7:
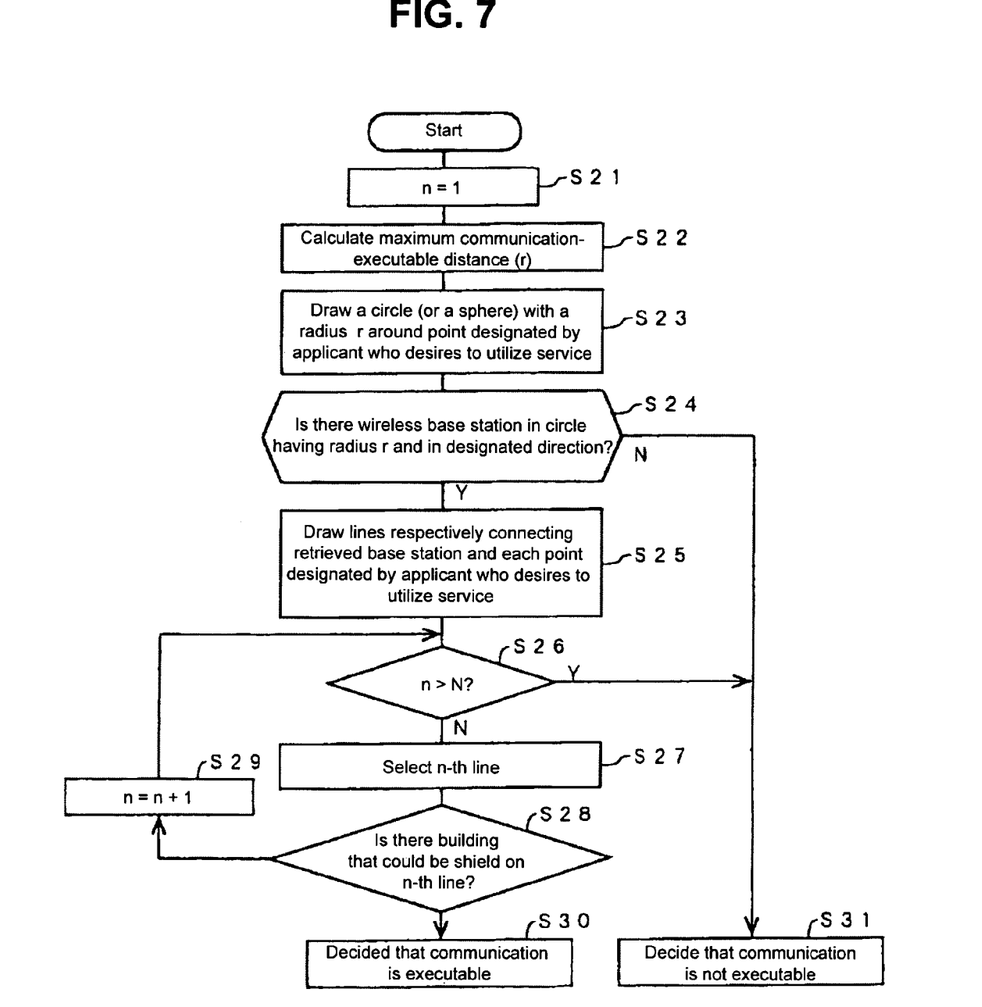
FIG. 7 is a flow chart showing a specific example of a transaction to decide whether communication is executable or not between two points.

A specific example of the decision as to whether communication between the two points is executable or not communication between the two points is executable or not will be explained below with reference to the flow chart shown in FIG. 7. In the step S21, n that depicts the number of the line connecting the two points is set as n=1. In the step S22, the service provider calculates a maximum communication-executable distance r from the difference between the transmission level at the preset transmitter side and the minimum potential receiving level at the receiver side. Then, in the step S23, a circle (or a sphere) having a radius r is drawn around a point designated by the applicant for utilizing service. In the step S24, a decision as to whether or not the wireless base station exists in the range that falls within the circle having a radius r and in a designated direction or within a preset angle in the direction is made. If the decision is negative, the operation proceeds to the step S31 and a decision such that communication is not executable is made. On the other hand, if the decision is positive, the operation proceeds to the step S25.

In the step S25, lines n which respectively connect the retrieved base station and each point designated by the applicant for utilizing service are drawn. It is assumed here that N lines in total number have been drawn. In the step S26, a decision as to whether the relation of n>N is valid or not. If this decision is negative, the n-th line is selected in the step S27. After proceeding to the step S28, a decision as to whether buildings those which could be shields exist on the n-th line or not. If the decision is positive, proceeding to the step S29, adding 1 to n there, and then back to the step S26.

The above-described transactions are carried out repeatedly, and meanwhile, if the decision in the step S28 results in negative, the operation proceeds to the step S30 and makes a decision such that communication is executable. On the other hand, if the decision in the step S26 results in positive, the operation proceeds to the step S31 and makes a decision such that communication is not executable. Note that the decision transactions in FIG. 7 can be completed shortly by the server.

Figure 2:
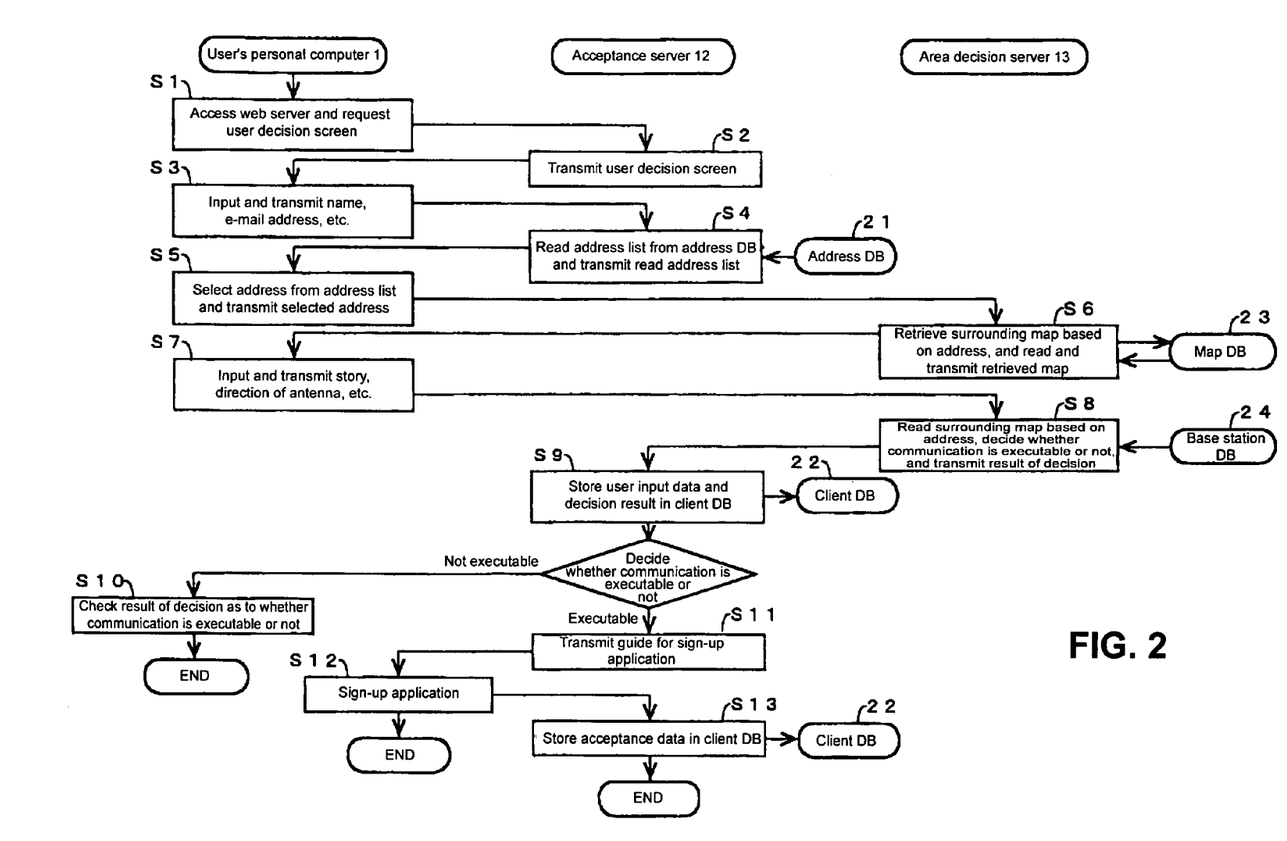
FIG. 2 is a timing chart for explaining the operations in one embodiment for the present invention.

In the step S9 in FIG. 2, the acceptance server 12 registers data inputted by the user and results of the above-described decision into the client database 22. Then, if communication is not executable, the operation proceeds to the step S10 and notifies the result of the decision as to whether communication is executable or not, namely the fact that communication is not executable, to the user's personal computer 1. On the other hand, if communication is executable, the operation proceeds to the step S11 and transmits a guide for sign-up application to the user's personal computer 1. In the step S12, when the user makes its sign-up application, the operation proceeds to the step S13, where the acceptance server 12 stores the acceptance data in the client database 22. With these procedures, acceptance of the sign-up application is completed.

Figure 8:
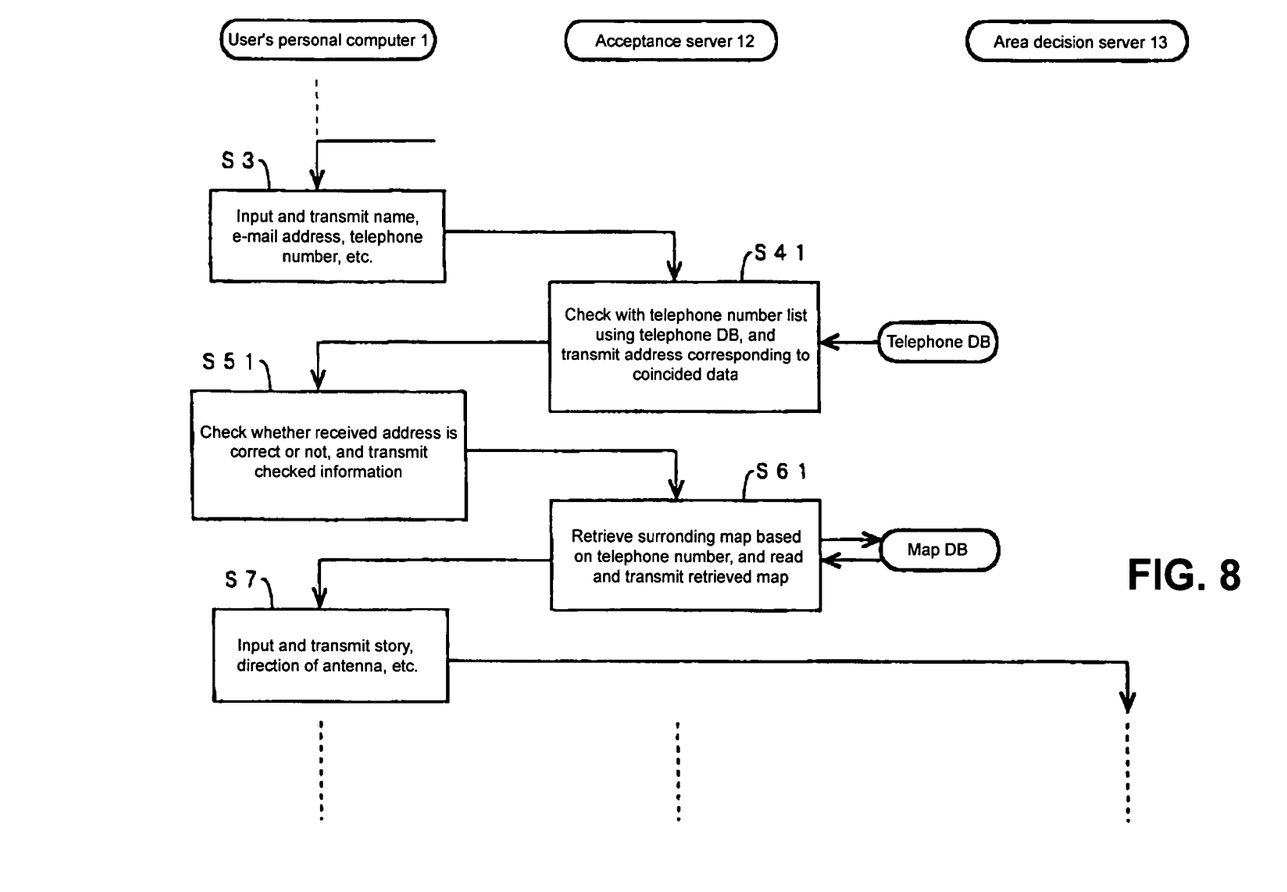
FIG. 8 is a timing chart showing the operations of the main parts of the second embodiment for the present invention.

Now, the second embodiment of the present invention will be described below. In this embodiment, a telephone number database is provided instead of the address database 32 in FIG. 1. Further, as shown in FIG. 8, the steps S41, S51 and S61 are employed instead of the steps S4, S5 and S6, respectively. As an example of the telephone number database, a database having been used for a navigation system of automobiles can be used.

Specifically, in the step S3, telephone numbers are transmitted in addition to names, e-mail addresses and the like. In the step S41, following to the receipt of the telephone numbers transmitted in the step S3, the telephone numbers are checked up with a telephone number list by means of the telephone number database, and data such as addresses and so on corresponding to the telephone numbers which accord with the inputted telephone numbers are transmitted. In the step S51, the user checks whether data such as the received addresses are correct or not. If the data are correct, the user transmits the checked information. If the data are not correct, the user corrects the errors and then transmits the checked data. In the step S61, the area decision server 13 retrieves, reads and transmits a map of the surrounding area based on the checked address. In the step S7, as described above, the user inputs a story of a building and the direction of the antenna and transmits these inputs. The following operations are the same as those shown in FIG. 2, and explanation thereof is therefore omitted here.

In case that the user has known the latitude and longitude of the emplacement where the antenna is installed, it is also possible to transmit the latitude and longitude information instead of the foregoing telephone numbers. In such a case, the information is checked up with a list of latitudes and longitudes by means of a latitude and longitude database, and data such as addresses and so on corresponding to the latitude and longitude which accord with the inputted latitude and longitude are transmitted. Then, the user checks whether the received data such as addresses are correct or not. If the data are correct, the user transmits the checked data. If the data are not correct, the user corrects the data and then transmits the checked data as well as the above-described case.

As evident from the foregoing description, the present invention allows to decide whether communication is executable or not with taking not only the planar location of the room where the applicant for utilizing service executes the service but also the height over the ground of the room into consideration. Hence, the present invention could have great influence if it is utilized by users who are living in cities for sign-up applications for the Internet such as wireless LAN systems.

According to the present invention, a decision as to whether communication is executable or not can be automatically made. Hence, the sign-up applications can be done automatically. Furthermore, since the decision as to whether communication is executable or not can be made with taking the planar location of the room where the applicant for utilizing service utilizes the service but also the height over the ground of the room into consideration, a decision as to whether communication is executable or not can be accurately made even for the users who live in middle and high tower buildings such as condominiums.

Further, the service provider does not need to send its staffs for carrying out a field confirmation test such as an optical outlook test to the place where the applicant for utilizing service desires to execute communication. Hence, the cost required for such a confirmation test will be needless.

Yet further, since the sign-up applications from the applicants who desire to utilize the services can be transacted automatically by means of a server connected to a web, the service provider does not need to locate the reception staffs. Hence, the cost required for such staffs will be needless, and erroneous inputs in the sign-up applications will be avoidable from occurring.

The invention claimed is:

1. A method for accepting on a network sign-up applications from applicants who desire to utilize wireless communication services upon requests from the applicants by means of a server of a wireless communication service provider that provides wireless communication services between one of antennas installed at a plurality of wireless base stations and an antenna installed at the user side, and a database containing at least map information and base station information relating to the emplacements and heights over the ground of the antennas installed at each of the plurality of wireless base stations, said method is characterized by comprising:

a step for receiving by the server data relating to the emplacement decision information transmitted from the applicant who desires to utilize wireless communication services via the network, a step for reading map information from the database on the basis of the data relating to the emplacement decision information and deciding one wireless base station out of a plurality of wireless base stations, a step for reading map information from the database on the basis of the data relating to the emplacement decision information and acquiring emplacement position information relating to at least the height over the ground and the direction of the antenna to be installed at the side of the applicant who desires to utilize the wireless communication services, a step for making a decision as to whether communication between the antenna at the side of the applicant who desires to utilize the wireless communication services and the antenna at the decided wireless base station based on the acquired emplacement information of the antenna at the side of the applicant and the base station information of the antenna at the decided wireless base station, a step for transmitting information of accepting the sign-up application to the applicant who desires to utilize the wireless communication services when it is decided that the communication is executable in the decision as to whether communication is executable or not, and wherein the step for acquiring the emplacement information, map information is read from the database on the basis of the data relating to the emplacement decision information and the emplacement information is acquired from the applicant who desires to utilize the wireless communication services by transmitting to the applicant the map information and a message that requests production of the emplacement information relating to at least the height over the ground and the direction of the antenna to be installed at the side of the applicant.

2. A method for accepting sign-up applications from applicants who desire to utilize wireless communication services according to claim 1, characterized in that the database contains emplacement information, and the step for acquiring the emplacement information acquires the emplacement information from the database.

3. A method for accepting sign-up applications from applicants who desire to utilize wireless communication services according to claim 1, characterized in that the server provides information for selecting the emplacement decision information to the applicant who desires to utilize the wireless communication services before the step for receiving the data relating to the emplacement decision information by the server.

4. A method for accepting sign-up applications from applicants who desire to utilize wireless communication services according to claim 1, characterized in that the emplacement decision information is at least one of the address, the telephone number and the latitude and longitude of the applicant who desires to utilize the wireless communication services.

5. A method for accepting sign-up applications from applicants who desire to utilize wireless communication services according to claim 1, characterized in that the database contains a client database and further contains at least one of an address database, a telephone number database and a latitude and longitude database.

6. A method for accepting sign-up applications from applicants who desire to utilize wireless communication services according to claim 5, characterized in that the decision as to whether communication between the two antennas is executable or not is made based on the user of the wireless communication services having been already registered in the client database.

7. A method for accepting sign-up applications from applicants who desire to utilize wireless communication services according to claim 1, characterized in that the map information is planar map information.

8. A method for accepting sign-up applications from applicants who desire to utilize wireless communication services according to claim 7, characterized in that the planar map information includes information relating to the total numbers of stories of each buildings, and the buildings can be displayed in their three-dimensional views upon requirement.

9. A method for accepting sign-up applications from applicants who desire to utilize wireless communication services according to claim 1, characterized in that the decision as to whether communication between the two antennas is executable or not is made on the basis of the three-dimensional displays of the emplacement information relating to the height over the ground and the direction of the antenna to be installed by the side of the applicant who desires to utilize the wireless communication services and the base station information relating to the position and height over the ground of the antenna at the wireless base station.

10. A method for accepting sign-up applications from applicants who desire to utilize wireless communication services according to claim 9, characterized in that communication is decided as executable when the two antennas are visible from each other.

11. A method for accepting sign-up applications from applicants who desire to utilize wireless communication services according to claim 9, characterized in that the transmission characteristic between the two antennas is calculated, and a decision on the presence of buildings which can be shields between the two antennas is made based on the result of the calculation.

12. A method for accepting sign-up applications from applicants who desire to utilize wireless communication services according to claim 1, characterized in that, when it is decided in the step for making a decision as to whether communication is executable or not that communication between the two antennas is not executable, map information is read from the database on the basis of the data relating to the emplacement decision information, a still another wireless base station is decided out of the plurality of wireless base stations, and a decision as to whether communication between the antenna by the side of the applicant who desires to utilize the wireless communication services and the antenna in the decided different wireless base station is executable or not is made based on the acquired emplacement information of the antenna by the side of the applicant and the base station information of the antenna in the decided base station.

13. A method for accepting on a network sign-up applications from applicants who desire to utilize wireless communication services upon requests from the applicants by means of a server of a wireless communication service provider that provides wireless communication services between one of antennas installed at a plurality of wireless base stations and an antenna installed at the user side, and a database containing at least map information and base station information relating to the emplacements and heights over the ground of the antennas installed at each of the plurality of wireless base stations, said method is characterized by comprising:

a step for receiving by the server data relating to the emplacement decision information transmitted from the applicant who desires to utilize wireless communication services via the network, a step for reading map information from the database on the basis of the data relating to the emplacement decision information and deciding one wireless base station out of a plurality of wireless base stations, a step for reading map information from the database on the basis of the data relating to the emplacement decision information and acquiring emplacement position information relating to at least the height over the ground and the direction of the antenna to be installed at the side of the applicant who desires to utilize the wireless communication services, a step for making a decision as to whether communication between the antenna at the side of the applicant who desires to utilize the wireless communication services and the antenna at the decided wireless base station based on the acquired emplacement information of the antenna at the side of the applicant and the base station information of the antenna at the decided wireless base station, a step for transmitting information of accepting the sign-up application to the applicant who desires to utilize the wireless communication services when it is decided that the communication is executable in the decision as to whether communication is executable or not, and wherein the decision as to whether communication between the two antennas is executable or not is made on the basis of the three-dimensional displays of the emplacement information relating to the height over the ground and the direction of the antenna to be installed by the side of the applicant who desires to utilize the wireless communication services and the base station information relating to the position and height over the ground of the antenna at the wireless base station.

14. A method for accepting sign-up applications from applicants who desire to utilize wireless communication services according to claim 13, characterized in that communication is decided as executable when the two antennas are visible from each other.

15. A method for accepting sign-up applications from applicants who desire to utilize wireless communication services according to claim 13, characterized in that the transmission characteristic between the two antennas is calculated, and a decision on the presence of buildings which can be shields between the two antennas is made based on the result of the calculation.

16. A method for accepting on a network sign-up applications from applicants who desire to utilize wireless communication services upon requests from the applicants by means of a server of a wireless communication service provider that provides wireless communication services between one of antennas installed at a plurality of wireless base stations and an antenna installed at the user side, and a database containing at least map information and base station information relating to the emplacements and heights over the ground of the antennas installed at each of the plurality of wireless base stations, said method is characterized by comprising:

a step for receiving by the server data relating to the emplacement decision information transmitted from the applicant who desires to utilize wireless communication services via the network, a step for reading map information from the database on the basis of the data relating to the emplacement decision information and deciding one wireless base station out of a plurality of wireless base stations, a step for reading map information from the database on the basis of the data relating to the emplacement decision information and acquiring emplacement position information relating to at least the height over the ground and the direction of the antenna to be installed at the side of the applicant who desires to utilize the wireless communication services, a step for making a decision as to whether communication between the antenna at the side of the applicant who desires to utilize the wireless communication services and the antenna at the decided wireless base station based on the acquired emplacement information of the antenna at the side of the applicant and the base station information of the antenna at the decided wireless base station, a step for transmitting information of accepting the sign-up application to the applicant who desires to utilize the wireless communication services when it is decided that the communication is executable in the decision as to whether communication is executable or not, and wherein, when it is decided in the step for making a decision as to whether communication is executable or not that communication between the two antennas is not executable, map information is read from the database on the basis of the data relating to the emplacement decision information, a still another wireless base station is decided out of the plurality of wireless base stations, and a decision as to whether communication between the antenna by the side of the applicant who desires to utilize the wireless communication services and the antenna in the decided different wireless base station is executable or not is made based on the acquired emplacement information of the antenna by the side of the applicant and the base station information of the antenna in the decided base station.

* * * * *